United States Patent
Cui et al.

(10) Patent No.: US 12,408,188 B2
(45) Date of Patent: Sep. 2, 2025

(54) INTERFERENCE REJECTION COMBINING METHOD, RESOURCE INDICATION METHOD, AND COMMUNICATION APPARATUS

(71) Applicant: HUAWEI TECHNOLOGIES CO., LTD., Shenzhen (CN)

(72) Inventors: Songqi Cui, Beijing (CN); Hao Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 486 days.

(21) Appl. No.: 18/070,702

(22) Filed: Nov. 29, 2022

(65) Prior Publication Data
US 2023/0121167 A1  Apr. 20, 2023

Related U.S. Application Data

(63) Continuation of application No. PCT/CN2021/096126, filed on May 26, 2021.

(30) Foreign Application Priority Data

May 30, 2020 (CN) .......................... 202010480651.0

(51) Int. Cl.
| | |
|---|---|
| *H04W 72/541* | (2023.01) |
| *H04B 17/345* | (2015.01) |
| *H04W 8/24* | (2009.01) |
| *H04W 24/10* | (2009.01) |

(52) U.S. Cl.
CPC ........ *H04W 72/541* (2023.01); *H04B 17/345* (2015.01); *H04W 8/24* (2013.01); *H04W 24/10* (2013.01)

(58) Field of Classification Search
CPC ..... H04W 72/541; H04W 8/24; H04W 24/10; H04W 72/23; H04W 28/02; H04W 40/16;
(Continued)

(56) References Cited

U.S. PATENT DOCUMENTS

| | | | | |
|---|---|---|---|---|
| 2014/0233407 A1* | 8/2014 | Pourahmadi | .......... | H04L 5/0073 370/252 |
| 2014/0233466 A1 | 8/2014 | Pourahmadi et al. | | |

(Continued)

FOREIGN PATENT DOCUMENTS

| | | |
|---|---|---|
| CN | 104284361 A | 1/2015 |
| CN | 105794142 A | 7/2016 |

(Continued)

OTHER PUBLICATIONS

3GPP TSG RAN WG1 Meeting NR#3 R1-1716497,"Remaining aspects on interference estimation options and configuration"Nokia, Sep. 18-21, 2017, total 8 pages.

(Continued)

*Primary Examiner* — Tejis Daya
(74) *Attorney, Agent, or Firm* — HAUPTMAN HAM, LLP

(57) ABSTRACT

An interference rejection combining method, a resource indication method, and a communication apparatus, A terminal device receives a signal on a first resource. The first resource includes N first resource units, a ZP resource, and M second resource units, The first resource unit is a resource unit carrying a first DMRS, and the second resource unit is a resource unit carrying first data. The terminal device performs interference and noise measurement on a PDSCH based on a signal received on the N first resource units and a signal received on the ZP resource, to obtain an interference and noise measurement result. The terminal device demodulates a signal received on the M second resource units, to obtain the first data based on the interference and noise measurement result.

20 Claims, 7 Drawing Sheets

Network device         Terminal device

(58) Field of Classification Search
CPC .............. H04W 52/02; H04W 28/0236; H04W 52/0238; H04B 17/345; H04B 17/346; H04L 5/0051; H04J 11/0023; Y02D 30/70
See application file for complete search history.

(56) References Cited

U.S. PATENT DOCUMENTS

| | | | |
|---|---|---|---|
| 2018/0359069 | A1 | 12/2018 | Nam et al. |
| 2019/0253293 | A1 | 8/2019 | Sharma et al. |
| 2021/0126815 | A1* | 4/2021 | Lee ................... H04L 25/0224 |
| 2022/0131588 | A1* | 4/2022 | Elshafie ............. H04B 7/0626 |
| 2023/0188294 | A1* | 6/2023 | Qu ..................... H04J 11/005 370/329 |

FOREIGN PATENT DOCUMENTS

| | | |
|---|---|---|
| CN | 108156107 A | 6/2018 |
| WO | 2019059194 A1 | 3/2019 |

OTHER PUBLICATIONS

Extended European Search Report issued in corresponding European Application No. 21818984.3, dated May 3, 2024, pp. 1-12.
Chinese Office Action issued in corresponding Chinese Application No. 202010480651.0, dated Dec. 6, 2023, pp. 1-7.
Partial Supplementary European Search Report issued in corresponding European Application No. 21818984.3, dated Dec. 13, 2023, pp. 1-12.
Qualcomm Incorporated et al.,"Discussion on Bursty Interference Measurement Resources", 3GPP TSG RAN WG1 Meeting #90, Aug. 21-25, 2017 Prague, Czech Republic, R1-1713415, total: 6 pages.
International Search Report issued in corresponding International Application No. PCT/CN2021/096126, dated Aug. 16, 2021, pp. 1-10.

* cited by examiner

Network device    Terminal device

INTERFERENCE REJECTION COMBINING METHOD, RESOURCE INDICATION METHOD, AND COMMUNICATION APPARATUS

CROSS-REFERENCE TO RELATED APPLICATIONS

This application is a continuation of International Application No. PCT/CN2021/096126, filed on May 26, 2021, which claims priority to Chinese Patent Application No. 202010480651.0, filed on May 30, 2020. The disclosures of the aforementioned applications are hereby incorporated by reference in their entireties.

TECHNICAL FIELD

This application relates to the field of communication technologies, and in particular, to an interference rejection combining method, a resource indication method, and a communication apparatus.

BACKGROUND

In new radio (new radio, NR), an interference rejection combining (interference rejection combining, IRC) technology is usually used to improve receiving performance of a terminal device. Specifically, the terminal device estimates a covariance matrix of interference and noise of a physical downlink shared channel (Physical downlink shared channel, PDSCH) based on a signal received on a resource element (resource element, RE) carrying a demodulation reference signal (demodulation reference signal, DMRS). The covariance matrix of the interference and noise of the PDSCH represents a statistical characteristic of the interference and noise of the PDSCH, and is used for data demodulation. However, limited by a DMRS pattern, a quantity of REs carrying the DMRS is limited. In NR that supports multiple in multiple out (multiple in multiple out, MIMO), this easily leads to a case in which the covariance matrix that is of the interference and noise of the PDSCH and that is estimated only based on the signal received on the RE carrying the DMRS cannot accurately represent the statistical characteristic of the interference and noise of the PDSCH.

SUMMARY

Embodiments of this application provide an interference rejection combining method, a resource indication method, and a communication apparatus, so that a terminal device can perform interference and noise measurement with reference to a signal received on a zero power (zero power, ZP) resource, to help improve receiving performance of the terminal device.

According to a first aspect, an embodiment of this application provides an interference rejection combining method. The method specifically includes: A terminal device receives a signal on a first resource. The first resource includes N first resource units, a ZP resource, and M second resource units, the first resource unit is a resource unit carrying a first demodulation reference signal (demodulation reference signal, DMRS), the second resource unit is a resource unit carrying first data, and N and M are positive integers. Then, the terminal device performs interference and noise measurement on a physical downlink shared channel (physical downlink shared channel, PDSCH) based on a signal received on the N first resource units and a signal received on the ZP resource, to obtain an interference and noise measurement result, and demodulates, based on the interference and noise measurement result, a signal received on the M second resource units, to obtain the first data. The interference and noise measurement result indicates a covariance matrix of interference and noise of the PDSCH.

In this embodiment of this application, the interference and noise measurement result is obtained based on a signal received on a resource unit carrying a DMRS and the signal received on the ZP resource, to improve accuracy of statistical characteristic information that is of interference and noise received on a resource used for PDSCH transmission and that is represented by the covariance matrix that is of the interference and noise of the PDSCH and that is indicated by the interference measurement result. Therefore, when the terminal device can perform data demodulation based on the obtained covariance matrix of the interference and noise of the PDSCH, a probability that data demodulation succeeds is improved, to further help improve receiving performance of the terminal device.

In a possible design, the terminal device reports a terminal capability indication to a network device. The terminal capability indication indicates that the terminal device has a capability of supporting to measure the interference and noise of the PDSCH based on a combination of a DMRS and the ZP resource. This provides a reference basis for the network device to configure the ZP resource for the PDSCH of the terminal device.

In a possible design, the terminal device receives a signal on a second resource. The second resource includes P third resource units, a third resource, and Q fourth resource units, the third resource unit is a resource unit carrying a second DMRS, the third resource is at least one resource unit in the second resource other than the P third resource units and the Q fourth resource units, the fourth resource unit is a resource unit carrying second data, and P and Q are positive integers. Then, the terminal device reports a first interference matching scenario measurement result to the network device based on a signal received on the P third resource units and a signal received on the third resource. The first interference matching scenario measurement result indicates that interference to the second DMRS does not match interference to the second data. This helps further provide a reference basis for the network device to configure the ZP resource for the PDSCH of the terminal device, and helps improve resource utilization to an extent.

In a possible design, the terminal device receives resource indication information sent by the network device. The resource indication information indicates the ZP resource configured for the PDSCH of the terminal device.

In a possible design, the terminal device sends the first interference matching scenario measurement result to the network device in the following manner, to help reduce implementation complexity:

the terminal device performs interference and noise measurement on the P third resource units based on the signal received on the P third resource units, to obtain a first interference and noise sub-measurement result, where the first interference and noise sub-measurement result indicates a covariance matrix of interference and noise on the P third resource units;

the terminal device performs interference and noise measurement on the third resource based on the signal received on the third resource, to obtain a second interference and noise sub-measurement result, where the second interference and noise sub-measurement result indicates a covariance matrix of interference and noise on the third resource; and the terminal device sends the first interference matching scenario measurement result to the network device based on the first interference sub-measurement result and the second interference sub-measurement result.

In a possible design, the terminal device sends the first interference matching scenario measurement result to the network device based on the first interference sub-measurement result and the second interference sub-measurement result in the following manner, to further reduce implementation complexity:

the terminal device determines a first value based on the first interference sub-measurement result and the second interference sub-measurement result, where the first value indicates a difference between the interference and noise on the P third resource units and the interference and noise on the third resource; and the terminal device sends the first interference matching scenario measurement result to the network device when the first value is greater than or equal to a first threshold.

In a possible design, the first value satisfies the following expression:

$R = \|RuuP - RuuD\|_F^2$, where

R is the first value, RuuP is the covariance matrix of the interference and noise on the P third resource units, and RuuD is the covariance matrix of the interference and noise on the third resource.

In a possible design, when the third resource is not a ZP resource, the covariance matrix of the interference and noise on the third resource satisfies the following expression:

$$RuuD = \frac{1}{M_1} \sum_{i=0}^{M_1-1} y_i y_i^H - \frac{1}{M_1} \sum_{i=0}^{M_1-1} h_i h_i^H,$$

where

RuuD is the covariance matrix of the interference and noise on the third resource, M1 is a total quantity of resource units in the third resource, $y_i$ is a signal received on an $i^{th}$ resource unit in the third resource, and $h_i$ is a channel estimation value of the $i^{th}$ resource unit in the third resource.

In a possible design, when the third resource is a ZP resource, the covariance matrix of the interference and noise on the third resource satisfies the following expression:

$$RuuD = \frac{1}{M_1} \sum_{i=0}^{M_1-1} y_i y_i^H,$$

where

RuuD is the covariance matrix of the interference and noise on the third resource, M1 is the total quantity of resource units in the third resource, and $y_i$ is the signal received on the $i^{th}$ resource unit in the third resource.

In a possible design, the covariance matrix of the interference and noise of the PDSCH satisfies the following expression:

$$Ruu = \frac{1}{K} \sum_{j=0}^{K-1} n_j n_j^H,$$

$K = N + L$ where

Ruu is the covariance matrix of the interference and noise of the PDSCH, L is a total quantity of resource units in the ZP resource, and $n_j$ is an interference and noise signal on the N first resource units and a $j^{th}$ resource unit in the L resource units in the ZP resource.

In a possible design, when the $j^{th}$ resource unit is a first resource unit, $n_j$ satisfies the following expression:

$n_j = y_j - h_j x_j$, where $y_j$ is a signal received on the $j^{th}$ resource unit, is a channel estimation value of the $j^{th}$ resource unit, and $x_j$ is the first DMRS.

In a possible design, when the $j^{th}$ resource unit is a resource unit in the ZP resource, $n_j$ satisfies the following expression:

$n_j = y_j$, where $y_j$ is the signal received on the $j^{th}$ resource unit.

In a possible design, a time domain resource of the ZP resource is some or all time domain resources of the N first resource units. When the time domain resource of the ZP resource is some time domain resources of the N first resource units, this helps improve resource utilization. When the time domain resource of the ZP resource is all time domain resources of the N first resource units, the method in this embodiment of this application may be applied to a multi-user (multi-user, MU) scenario.

According to a second aspect, an embodiment of this application provides a resource indication method. The method specifically includes: A network device receives a terminal capability indication and/or a first interference matching scenario measurement result from a terminal device, and sends resource indication information to the terminal device. The terminal capability indication indicates that the terminal device has a capability of supporting to measure interference and noise of a PDSCH based on a combination of a DMRS and a ZP resource, the first interference matching scenario measurement result indicates that interference to the DMRS of the terminal device does not match interference to data, and the resource indication information indicates the ZP resource configured for the PDSCH of the terminal device.

In this embodiment of this application, the network device may send the resource indication information to the terminal device when receiving the terminal capability indication and/or the first interference matching scenario measurement result from the terminal device. The resource indication information indicates the ZP resource configured for the PDSCH of the terminal device. This helps improve receiving performance of the terminal device.

In a possible design, a time domain resource of the ZP resource is some or all time domain resources in the PDSCH resource that are used to carry the DMRS. When the time domain resource of the ZP resource is some time domain resources of the N first resource units, this helps improve resource utilization. When the time domain resource of the ZP resource is all time domain resources of the N first resource units, the method in this embodiment of this application may be applied to an MU scenario.

According to a third aspect, an embodiment of this application provides a communication apparatus. The apparatus specifically includes a processing unit and a transceiver unit. The transceiver unit is configured to receive a signal on a first resource. The first resource includes N first resource units, a ZP resource, and M second resource units, the first resource unit is a resource unit carrying a first DMRS, the second resource unit is a resource unit carrying first data, and N and M are positive integers.

The processing unit is configured to: perform interference and noise measurement on a PDSCH based on a signal received on the N first resource units and a signal received on the ZP resource, to obtain an interference and noise measurement result, and demodulate, based on the interference and noise measurement result, a signal received on the M second resource units, to obtain the first data. The interference and noise measurement result indicates a covariance matrix of interference and noise of the PDSCH.

In a possible design, the transceiver unit is further configured to report a terminal capability indication to a network device. The terminal capability indication indicates that the communication apparatus has a capability of supporting to measure the interference and noise of the PDSCH based on a combination of a DMRS and the ZP resource.

In a possible design, the transceiver unit is further configured to receive a signal on a second resource. The second resource includes P third resource units, a third resource, and Q fourth resource units, the third resource unit is a resource unit carrying a second DMRS, the third resource is at least one resource unit in the second resource other than the P third resource units and the Q fourth resource units, the fourth resource unit is a resource unit carrying second data, and P and Q are positive integers. The processing unit is further configured to trigger the transceiver unit to report a first interference matching scenario measurement result to the network device based on a signal received on the P third resource units and a signal received on the third resource. The first interference matching scenario measurement result indicates that interference to the second DMRS does not match interference to the second data.

In a possible design, the transceiver unit is further configured to receive resource indication information sent by the network device. The resource indication information indicates the ZP resource configured for the PDSCH of the communication apparatus.

In a possible design, the processing unit is configured to trigger the transceiver unit to send the first interference matching scenario measurement result to the network device based on the signal received on the P third resource units and the signal received on the third resource in the following manner:

the processing unit is configured to: perform interference and noise measurement on the P third resource units based on the signal received on the P third resource units, to obtain a first interference and noise sub-measurement result, perform interference and noise measurement on the third resource based on the signal received on the third resource, to obtain a second interference and noise sub-measurement result, and trigger the transceiver unit to send the first interference matching scenario measurement result to the network device based on the first interference sub-measurement result and the second interference sub-measurement result, where the first interference and noise sub-measurement result indicates a covariance matrix of interference and noise on the P third resource units, and the second interference and noise sub-measurement result indicates a covariance matrix of interference and noise on the third resource.

In a possible design, the processing unit is configured to trigger the transceiver unit to send the first interference matching scenario measurement result to the network device based on the first interference sub-measurement result and the second interference sub-measurement result in the following manner:

the processing unit is configured to: determine a first value based on the first interference sub-measurement result and the second interference sub-measurement result; and when the first value is greater than or equal to a first threshold, trigger the transceiver unit to send the first interference matching scenario measurement result to the network device, where the first value indicates a difference between the interference and noise on the P third resource units and the interference and noise on the third resource.

In a possible design, the first value satisfies the following expression:

$$R = \|RuuP - RuuD\|_F^2, \text{ where}$$

R is the first value, RuuP is the covariance matrix of the interference and noise on the P third resource units, and RuuD is the covariance matrix of the interference and noise on the third resource.

In a possible design, when the third resource is not a ZP resource, the covariance matrix of the interference and noise on the third resource satisfies the following expression:

$$RuuD = \frac{1}{M_1} \sum_{i=0}^{M_1-1} y_i y_i^H - \frac{1}{M_1} \sum_{i=0}^{M_1-1} h_i h_i^H,$$

where

RuuD is the covariance matrix of the interference and noise on the third resource, M1 is a total quantity of resource units in the third resource, $y_i$ is a signal received on an $i^{th}$ resource unit in the third resource, and $h_i$ is a channel estimation value of the $i^{th}$ resource unit in the third resource.

In a possible design, when the third resource is a ZP resource, the covariance matrix of the interference and noise on the third resource satisfies the following expression:

$$RuuD = \frac{1}{M_1} \sum_{i=0}^{M_1-1} y_i y_i^H,$$

where

RuuD is the covariance matrix of the interference and noise on the third resource, M1 is the total quantity of resource units in the third resource, and $y_i$ is a signal received on the $i^{th}$ resource unit in the third resource.

In a possible design, the covariance matrix of the interference and noise of the PDSCH satisfies the following expression:

$$Ruu = \frac{1}{K} \sum_{j=0}^{K-1} n_j n_j^H,$$

$$K = N + L$$

where

Ruu is the covariance matrix of the interference and noise of the PDSCH, L is a total quantity of resource units in the ZP resource, and $n_j$ is an interference and noise signal on the N first resource units and a $j^{th}$ resource unit in the L resource units in the ZP resource.

In a possible design, when the $j^{th}$ resource unit is a first resource unit, $n_j$ satisfies the following expression:

$$n_j = y_j - h_j x_j, \text{ where}$$

$y_j$ is a signal received on the $j^{th}$ resource unit, $h_j$ is a channel estimation value of the $j^{th}$ resource unit, and is the first DMRS.

In a possible design, when the $j^{th}$ resource unit is a resource unit in the ZP resource, $n_j$ satisfies the following expression:

$$n_j = y_j, \text{ where}$$

$y_j$ is the signal received on the $j^{th}$ resource unit.

In a possible design, a time domain resource of the ZP resource is some or all time domain resources of the N first resource units.

According to a fourth aspect, an embodiment of this application provides another communication apparatus. The apparatus specifically includes a receiving unit and a sending unit. The receiving unit is configured to receive a terminal capability indication and/or a first interference matching scenario measurement result from a terminal device. The terminal capability indication indicates that the terminal device has a capability of supporting to measure interference and noise of a PDSCH based on a combination of a demodulation reference signal DMRS and a zero power ZP resource, and the first interference matching scenario measurement result indicates that interference to the DMRS of the terminal device does not match interference to data. The sending unit is configured to send resource indication information to the terminal device. The resource indication information indicates the ZP resource configured for the PDSCH of the terminal device.

In a possible design, a time domain resource of the ZP resource is some or all time domain resources in the PDSCH resource that are used to carry the DMRS.

According to a fifth aspect, an embodiment of this application provides another communication apparatus. The communication apparatus is applied to a terminal device, or the communication apparatus is a terminal device. The communication apparatus has a function of implementing the method in any one of the first aspect or the possible designs of the first aspect. The apparatus may include a corresponding component (means) that is configured to perform a step or function described in the foregoing aspects. The steps or the functions may be implemented by using software, hardware (for example, a circuit), or a combination of hardware and software.

In a possible design, the communication apparatus includes one or more processors and a communication unit. The one or more processors are configured to support a signal processing apparatus to perform a function in the foregoing methods. The communication unit is configured to support the communication apparatus to communicate with another device, to implement a receiving and/or sending function. For example, a signal is received on a first resource.

In a possible design, the communication apparatus may further include one or more memories. The memory is configured to be coupled to the processor, and is configured to store program instructions and/or data that are/is necessary for the apparatus. The one or more memories may be integrated with the processor, or may be disposed independent of the processor. This is not limited in this application.

The communication unit may be a transceiver or a transceiver circuit. In some embodiments, the transceiver may alternatively be an input/output circuit or an interface.

The communication apparatus may alternatively be a communication chip. The communication unit may be an input/output circuit or interface of the communication chip.

In a possible design, the communication apparatus includes a transceiver, a processor, and a memory. The transceiver is configured to receive and send a signal. The memory is configured to store program instructions. The processor is configured to run the program instructions in the memory, so that the communication apparatus performs the method in any one of the first aspect or the possible designs of the first aspect by using the transceiver.

According to a sixth aspect, an embodiment of this application provides another communication apparatus. The communication apparatus is applied to a network device, or the communication apparatus is a network device. The communication apparatus has a function of implementing the method in any one of the second aspect or the possible designs of the second aspect. The apparatus may include a corresponding component (means) that is configured to perform a step or function described in the foregoing aspects. The steps or the functions may be implemented by using software, hardware (for example, a circuit), or a combination of hardware and software.

In a possible design, the communication apparatus includes one or more processors and a communication unit. The one or more processors are configured to support a signal processing apparatus to perform a function in the foregoing methods. The communication unit is configured to support the communication apparatus to communicate with another device, to implement a receiving and/or sending function. For example, resource indication information is sent.

In a possible design, the communication apparatus may further include one or more memories. The memory is configured to be coupled to the processor, and is configured to store program instructions that are necessary for the apparatus. The one or more memories may be integrated with the processor, or may be disposed independent of the processor. This is not limited in this application.

The communication unit may be a transceiver or a transceiver circuit. In some embodiments, the transceiver may alternatively be an input/output circuit or an interface.

The communication apparatus may alternatively be a communication chip. The communication unit may be an input/output circuit or interface of the communication chip.

In a possible design, the communication apparatus includes a transceiver, a processor, and a memory. The transceiver is configured to receive and send a signal. The memory is configured to store program instructions. The processor is configured to run the program instructions in the memory, so that the communication apparatus performs the method in any one of the second aspect or the possible designs of the second aspect by using the transceiver.

According to a seventh aspect, an embodiment of this application provides a communication system. The communication system includes a terminal device and a network device. The terminal device is configured to perform the method in any one of the first aspect or the possible designs of the first aspect; and/or the network device is configured to perform the method in any one of the second aspect or the possible designs of the second aspect.

According to an eighth aspect, an embodiment of this application provides a computer-readable storage medium, configured to store program instructions. The program instructions include instructions used to perform the methods in the foregoing aspects. In other words, when the program instructions run on a computer, the computer is enabled to perform the method in any one of the first aspect or the possible designs of the first aspect, or perform the method in any one of the second aspect or the possible designs of the second aspect.

According to a ninth aspect, an embodiment of this application provides a chip system. The chip system specifically includes a processor and a memory. The memory stores program instructions. The processor is configured to invoke the program instructions from the memory, so that a communication device on which the chip system is installed performs the method in any one of the first aspect or the possible designs of the first aspect, or performs the method in any one of the second aspect or the possible designs of the second aspect.

According to a tenth aspect, a computer program product is provided. The computer program product includes computer program code, and when the computer program code is run on a computer, the computer is enabled to perform the methods in the foregoing aspects.

For technical effects brought by the third aspect to the tenth aspect and the possible design manners, refer to descriptions of technical effects of some possible design manners in the foregoing methods. Details are not described herein again.

DESCRIPTION OF EMBODIMENTS

Figure 1:
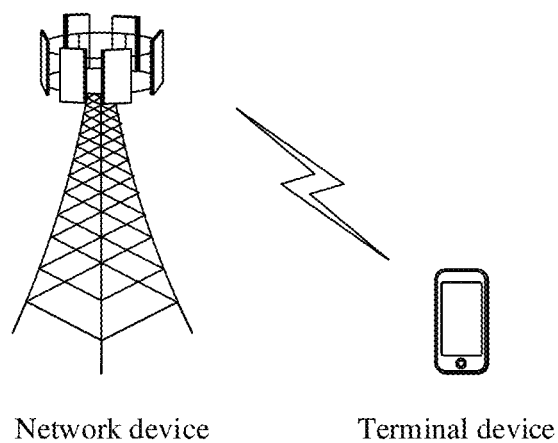
FIG. 1 is a schematic diagram of a communication system according to an embodiment of this application.

It should be understood that, in this application, the term "and/or" describes an association relationship between associated objects and represents that three relationships may exist. For example, A and/or B may represent the following three cases: Only A exists, both A and B exist, and only B exists. The character "/" usually indicates an "or" relationship between associated objects. In this application, "at least one" means one or more, and "a plurality of" means two or more. "At least one of the following items (pieces)" or a similar expression thereof indicates any combination of these items, including a single item (piece) or any combination of a plurality of items (pieces). For example, at least one (piece) of a, b, or c may represent a, b, c, a and b, a and c, b and c, or a, b and c, and each of a, b, c may be an element, or may be a set including one or more elements.

In addition, it should be understood that in description of this application, terms such as "first" and "second" are merely used for distinguishing and description, but should not be understood as indicating or implying relative importance, or should not be understood as indicating or implying a sequence.

In this application, "for example", "in some embodiments", "in some other embodiments", or the like are used to represent an example, an illustration, or a description. Any embodiment or design scheme described as an "example" in this application should not be explained as being more preferred or having more advantages than another embodiment or design scheme. Exactly, "for example" is used to present a concept in a specific manner.

"Of (of)", "corresponding (corresponding, relevant)", and "corresponding (corresponding)" in this application may be interchangeably used sometimes. It should be noted that expressed meanings are the same when differences are not emphasized. In embodiments of this application, communication and transmission may be interchangeably used sometimes. It should be noted that expressed meanings are the same when differences are not emphasized. For example, transmission may include sending and/or receiving, and may be a noun or a verb.

Embodiments of this application may be applied to various communication systems such as a long term evolution (long term evolution, LTE) system, a worldwide interoperability for microwave access (worldwide interoperability for microwave access, WiMAX) communication system, a future 5th generation (5th Generation, 5G) system, for example, a new generation radio access technology (new radio access technology, NR), and a future communication system, for example, a 6G system.

A system architecture and a service scenario described in embodiments of this application are intended to describe technical solutions in embodiments of this application more clearly, and do not constitute any limitation on the technical solutions provided in embodiments of this application. A person of ordinary skill in the art may know that with evolution of the network architecture and emergence of a new service scenario, the technical solutions provided in embodiments of this application are also applicable to similar technical problems.

For example, FIG. 1 is a schematic diagram of a communication system according to an embodiment of this application. The communication system includes a terminal device and a network device. The terminal device communicates with the network device through a wireless interface.

In this embodiment of this application, the terminal device is a device having a wireless transceiver function, and may be referred to as a terminal (terminal), user equipment (user equipment, UE), a mobile station (mobile station, MS), a mobile terminal (mobile terminal, MT), an access terminal device, a vehicle-mounted terminal device, a mobile station, a mobile device, or the like. A position of the terminal device may be fixed or mobile. It should be noted that the terminal device may support at least one wireless communication technology, for example, long term evolution (long term evolution, LTE), NR, and wideband code division multiple access (wideband code division multiple access, WCDMA). For example, the terminal device may be a mobile phone (mobile phone), a tablet computer (pad), a desktop computer, a laptop computer, an all-in-one computer, a vehicle-mounted terminal, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical surgery), a wireless terminal in smart grid (smart grid), a wireless terminal in transportation safety (transportation safety), a wireless terminal in smart city (smart city), a wireless terminal in smart home (smart home), a cellular phone, a cordless telephone set, a session initiation protocol (session initiation protocol, SIP) telephone, a wireless local loop (wireless local loop, WLL) station, a personal digital assistant (personal digital assistant, PDA), a handheld device having a wireless communication function, a computing device or another processing device connected to a wireless modem, a wearable device, a terminal device in a future mobile communication network, or a terminal device in a future evolved public land mobile network (public land mobile network, PLMN).

In this embodiment of this application, the network device may also be referred to as an access network device, a radio access network (radio access network, RAN) device, or the like, and is a device that provides a wireless communication function for a terminal. For example, the network device includes but is not limited to a next generation base station (gNodeB, gNB) in a 5th generation (5th generation, 5G), an evolved nodeB (evolved nodeB, eNB), a radio network controller (radio network controller, RNC), a nodeB (nodeB, NB), a base station controller (base station controller, BSC), a base transceiver station (base transceiver station, BTS), a home base station (for example, a home evolved nodeB, or home nodeB, HNB), a baseband unit (baseband unit, BBU), a transmission and reception point (transmitting and receiving point, TRP), a transmitting point (transmitting point, TP), or a mobile switching center.

The following explains some terms used in embodiments of this application, to facilitate understanding of a person skilled in the art.

1. Symbol: The symbol in embodiments of this application is an orthogonal frequency division multiplexing (orthogonal frequency division multiplexing, OFDM) symbol, and communication is usually performed at a granularity of a symbol in time domain Time length of one symbol=1/subcarrier spacing. For example, if a subcarrier spacing of 15 kHz is supported in LTE, a time length of one symbol in LTE is 1/15 kHz=66.7 μs. However, different subcarrier spacings are supported in NR. Therefore, different subcarrier spacings correspond to different time lengths of symbols. For example, a time length of a symbol corresponding to a subcarrier spacing of 30 kHz is 1/30 kHz=33.3 μs.

Figure 2:
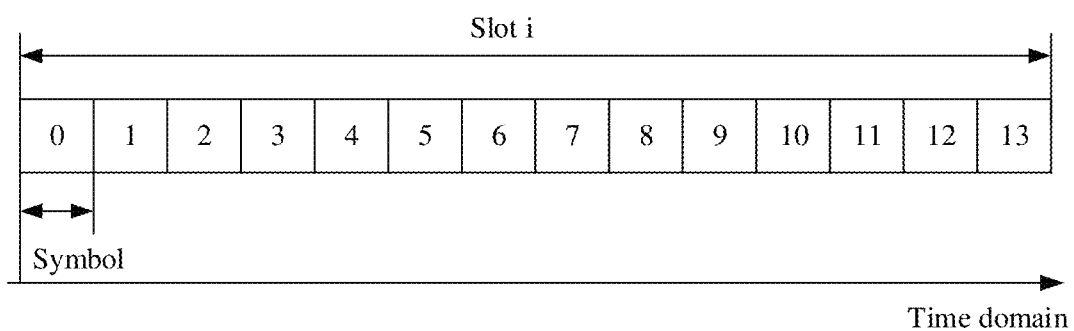
FIG. 2 is a schematic diagram of a structure of a slot according to an embodiment of this application.

2. Slot: Usually, a quantity of symbols included in the slot is related to a cyclic prefix (cyclic prefix, CP) type. For example, in LTE, for a normal (normal) CP, one slot includes seven symbols; and for an extended (extended) CP, one slot includes six symbols. However, in NR, for a normal CP, one slot includes 14 symbols; and for an extended CP, one slot includes 12 symbols. In addition, in NR, usually, resource scheduling is performed at a granularity of a slot in time domain, and a minimum time granularity used for communication in time domain is a symbol. Therefore, to help distinguish between different symbols in one slot, different symbols in one slot may be sequentially identified in a time sequence. For example, as shown in FIG. 2, in NR, a slot i includes 14 symbols, and the 14 symbols are respectively a symbol 0, a symbol 1, a symbol 2, a symbol 3, a symbol 4, a symbol 5, a symbol 6, a symbol 7, a symbol 8, a symbol 9, a symbol 10, a symbol 11, a symbol 12, and a symbol 13. Herein, i is a slot number, and may be a positive integer such as 0, 1, or 2. It should be noted that, in some scenarios, resource scheduling may be alternatively performed at a granularity of a mini slot (mini slot) in time domain. In this case, the minimum time granularity used for communication in time domain may alternatively be a symbol.

Figure 3:
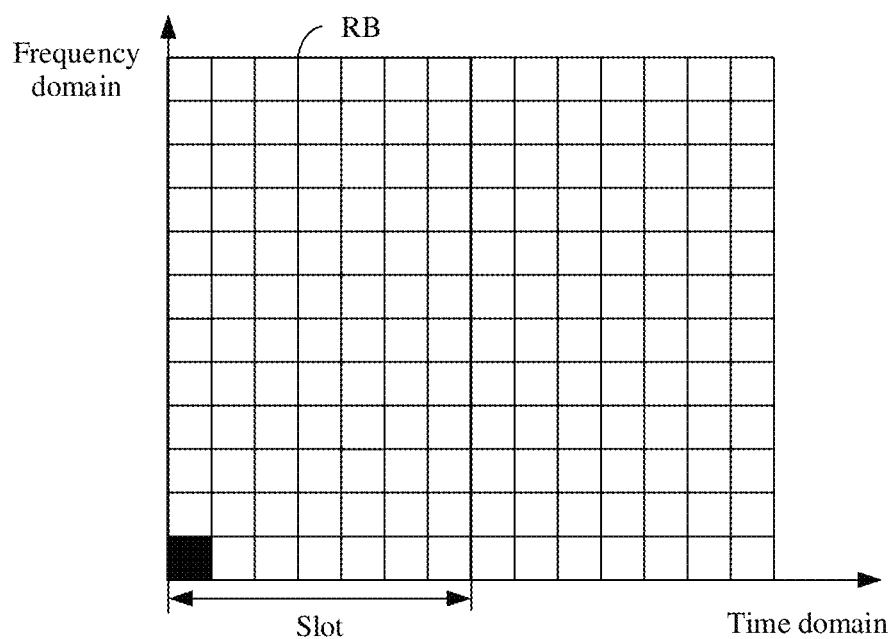
FIG. 3 is a schematic diagram of a time-frequency resource according to an embodiment of this application.
Figure 4A:
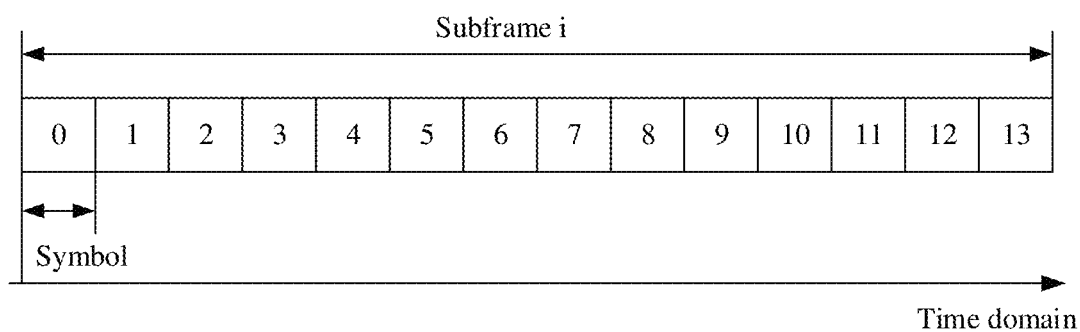
FIG. 4A is a schematic diagram of a structure of a subframe according to an embodiment of this application.
Figure 4B:
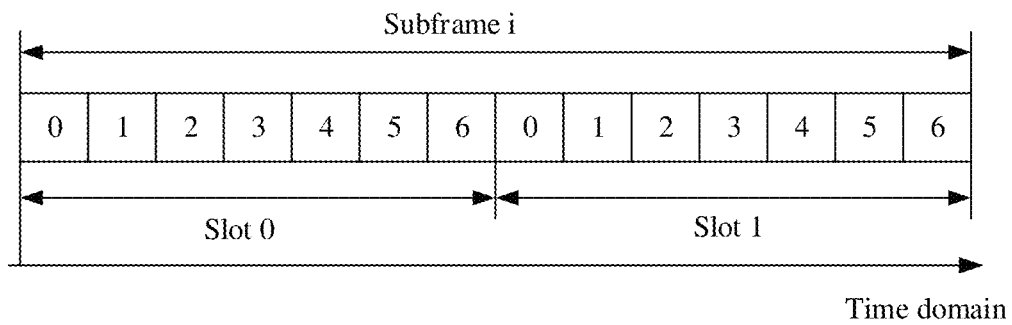
FIG. 4B is a schematic diagram of a structure of another subframe according to an embodiment of this application.

3. Resource block (resource block, RB): A normal CP is used as an example. In LTE, resource scheduling is performed at a granularity of two RBs. For example, as shown in FIG. 3, one RB includes seven symbols in time domain, and includes 12 subcarriers in frequency domain, and a subcarrier spacing is 15 kHz. Specifically, in LTE, seven symbols may form one slot, and 14 symbols form one subframe. A minimum resource granularity used for communication is a resource element (resource element, RE). As shown by a black shadow area in FIG. 3, the minimum resource granularity includes one subcarrier in frequency domain, and includes one symbol in time domain. In addition, in LTE, resource scheduling is performed at a granularity of a subframe in time domain, and a minimum time granularity used for communication in time domain is a symbol. Therefore, to help distinguish between different symbols in one subframe, different symbols in one subframe may be sequentially identified in a time sequence. For example, different symbols are identified in a unit of a subframe. As shown in FIG. 4A, in LTE, a subframe i includes 14 symbols, and the 14 symbols are respectively a symbol 0, a symbol 1, a symbol 2, a symbol 3, a symbol 4, a symbol 5, a symbol 6, a symbol 7, a symbol 8, a symbol 9, a symbol 10, a symbol 11, a symbol 12, and a symbol 13. For another example, different symbols are identified in a unit of a slot. As shown in FIG. 4B, in LTE, a subframe i includes a slot 0 and a slot 1. The slot 0 includes seven symbols, and the seven symbols are respectively a symbol 0, a symbol 1, a symbol 2, a symbol 3, a symbol 4, a symbol 5, and a symbol 6. The slot 1 includes seven symbols, and the seven symbols are respectively a symbol 0, a symbol 1, a symbol 2, a symbol 3, a symbol 4, a symbol 5, and a symbol 6. Herein, i is a subframe number, and may be a positive integer such as 0, 1, or 2.

4. DMRS: In NR, the DMRS may be used by a terminal device to perform downlink channel estimation. A subcarrier occupied by the DMRS on one symbol is related to a factor such as a DMRS type or a code division multiplexing (code division multiplexing, CDM) group number indicated by DCI. In addition, a length of one DMRS in time domain may be one symbol or K consecutive symbols, and a value of K may be 2 or a positive integer greater than 2. It should be noted that, when the length of the DMRS in time domain is one symbol, the DMRS may also be referred to as a single-symbol DMRS (single-symbol DMRS), a one-symbol DMRS, or the like. When the length of the DMRS in time domain is two consecutive symbols, the DMRS may also be referred to as a double-symbol DMRS (double symbol DMRS), a two-symbol DMRS, or the like.

In time domain, a time domain position of a first DMRS on a PDSCH is related to a mapping type of the PDSCH. In NR, the mapping type of the PDSCH includes a type A (type A) or a type B (type B). For example, the PDSCH is scheduled in a slot i. Herein, i may be a positive integer such as 0, 1, or 2. If the mapping type of the PDSCH is type A, in time domain, the time domain position of the first DMRS on the PDSCH may be a symbol 2 or a symbol 3 in the slot i. A start symbol of the PDSCH may be a symbol 0, a symbol 1, a symbol 2, or a symbol 3 in the slot i, and is usually not later than the time domain position of the first DMRS. If the mapping type of the PDSCH is type B, the time domain position of the first DMRS on the PDSCH is a start symbol of the PDSCH, and the start symbol of the PDSCH may be any of a symbol 0 to a symbol 12 in the slot i, and is related to scheduling of a network device.

Figure 5:
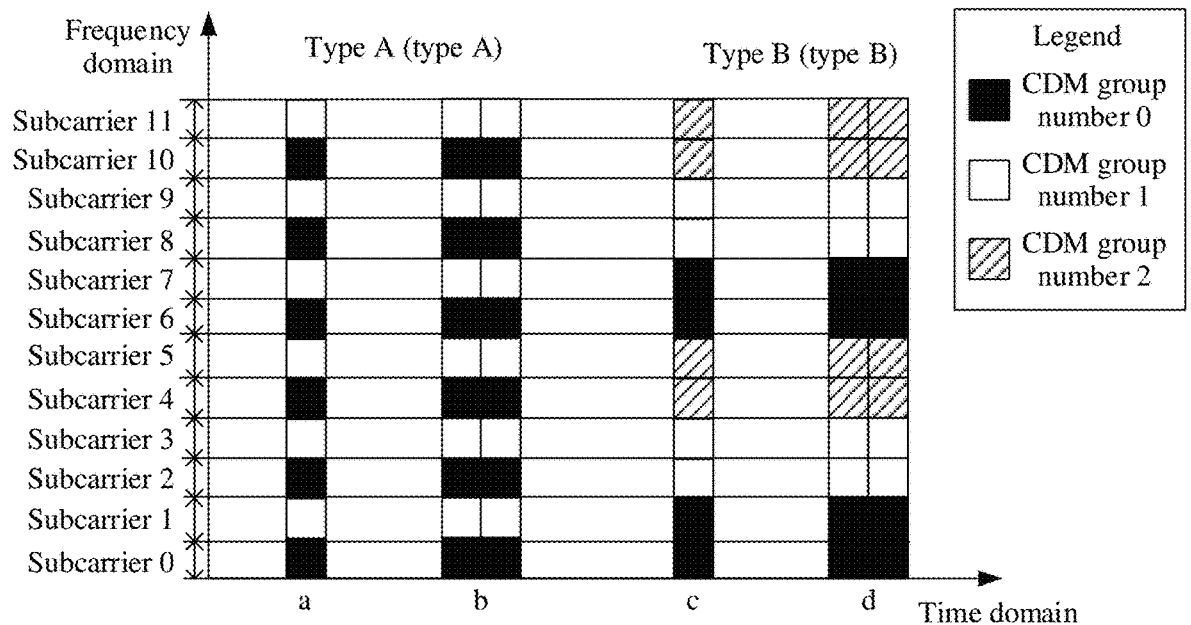
FIG. 5 is a schematic diagram of a DMRS pattern according to an embodiment of this application.

In addition, different PDSCH DMRS mapping manners (configuration type) correspond to different DMRS patterns (DMRS pattern). For example, a one-symbol DMRS is used as an example. For a PDSCH DMRS configuration type 1, when a CDM group number is 0 or 1, a pattern of subcarriers occupied by the DMRS on one symbol may be shown by a in FIG. 5. It can be learned from a in FIG. 5 that, when the CDM group number is 0, the subcarriers occupied by the DMRS on the one symbol are subcarriers 0, 2, 4, 6, 8, and 10. When the CDM group number is 1, the subcarriers occupied by the DMRS on the one symbol are subcarriers 1, 3, 5, 7, 9, and 11. For another example, a two-symbol DMRS is used as an example. For a PDSCH DMRS configuration type 1, when a CDM group number is 0 or 1, a pattern of subcarriers occupied by the DMRS on two consecutive symbols may be shown by b in FIG. 5. It can be learned from b in FIG. 5 that, when the CDM group number is 0, the subcarriers occupied by the DMRS on two symbols are subcarriers 0, 2, 4, 6, 8, and 10. When the CDM group number is 1, the subcarriers occupied by the DMRS on two symbols are subcarriers 1, 3, 5, 7, 9, and 11. For still another example, a one-symbol DMRS is used as an example. For a PDSCH DMRS configuration type 2, when a CDM group number is 0, 1, or 2, a pattern of subcarriers occupied by the DMRS on one symbol may be shown by c in FIG. 5. It can be learned from c in FIG. 5 that, when the CDM group number is 0, the subcarriers occupied by the DMRS on the one symbol are subcarriers 0, 1, 6, and 7. When the CDM group number is 1, the subcarriers occupied by the DMRS on the one symbol are subcarriers 2, 3, 8, and 9. When the CDM group number is 2, the subcarriers occupied by the DMRS on the one symbol are subcarriers 4, 5, 10, and 11. For yet another example, a two-symbol DMRS is used as an example. For a PDSCH DMRS configuration type 2, when a CDM group number is 0, 1, or 2, a pattern of subcarriers occupied by the DMRS on two consecutive symbols may be shown by d in FIG. 5. It can be learned from d in FIG. 5 that, when the CDM group number is 0, the subcarriers occupied by the DMRS on the two symbols are subcarriers 0, 1, 6, and 7. When the CDM group number is 1, the subcarriers occupied by the DMRS on the two symbols are subcarriers 2, 3, 8, and 9. When the CDM group number is 2, the subcarriers occupied by the DMRS on the two symbols are subcarriers 4, 5, 10, and 11.

5. Antenna port: In embodiments of this application, the antenna port is an antenna port used to carry a specific physical channel (for example, a PDSCH) and/or a physical signal. When demodulating signals sent at a same antenna port, a receive end may consider that the signals sent at a same antenna port have a same channel or related channels. It should be understood that, in embodiments of this application, the antenna port is a logical meaning. For example, a signal receive end may identify, through the antenna port, signals having different transmission channels. Specifically, an antenna port of a DMRS is usually a logical port. To be specific, an antenna port of each DMRS may be a logical antenna formed by virtualizing a physical port or by performing a weighting action on a plurality of physical ports by using a specific precoding matrix. DMRSs transmitted at different antenna ports may have a same pattern or may have different patterns.

6. Zero power (zero power, ZP) resource: In embodiments of this application, the ZP resource is not used to carry information, for example, data or a reference signal. In embodiments of this application, a ZP resource configured for a PDSCH of a terminal device may be some or all of time domain resources carrying a DMRS. An RB 1 is used as an example. The RB 1 is a slot 1 in time domain, includes a symbol 0 to a symbol 13, and includes 12 subcarriers in frequency domain. The 12 subcarriers are respectively a subcarrier 0 to a subcarrier 11. For example, if a time domain resource used to carry a DMRS on the RB 1 is a symbol 2 and a symbol 4, the ZP resource may be a symbol 2, a symbol 4, or a symbol 2 and a symbol 4 in time domain.

It should be noted that, in embodiments of this application, the ZP resource configured for the PDSCH of the terminal device may be UE-level. For example, a ZP resource configured for a PDSCH of a terminal device 1 is a resource 1. For the terminal device 1, the resource 1 carries neither data nor a reference signal. For a terminal device 2 (a terminal device other than the terminal device 1), the resource 1 may carry data or a reference signal, may not carry data or a reference signal, or the like. This is related to a resource configured by a network device for the terminal device 2, and is not affected by the resource 1, namely, the ZP resource configured for the PDSCH of the terminal device 1.

The following describes in detail a method provided in an embodiment of this application with reference to the communication system shown in FIG. 1.

Figure 6:
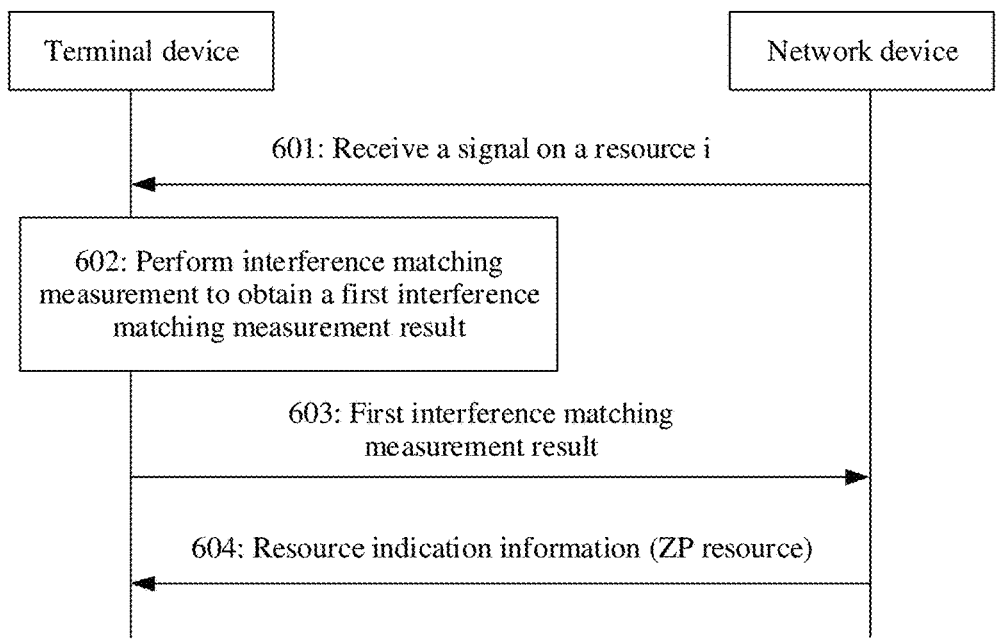
FIG. 6 is a schematic flowchart of a resource indication method according to an embodiment of this application.

For example, FIG. 6 is a schematic flowchart of a resource indication method according to an embodiment of this application. The method specifically includes the following steps.

601: A terminal device receives a signal on a resource i. The resource i includes P first resource units, a third resource, and Q second resource units, the first resource unit is a resource unit carrying a first DMRS, the second resource unit is a resource unit carrying first data, and the third resource is at least one resource unit in the resource i other than the P first resource units and the Q second resource units. P and Q are positive integers.

The resource i is a minimum granularity at which a time-frequency resource is scheduled, and a resource unit is a minimum time-frequency resource granularity for communication, namely, a minimum time-frequency resource granularity for signal transmission.

For example, a time domain resource of the third resource is some or all time domain resources of the P first resource units, and a frequency domain resource of the third resource is some or all frequency domain resources in the resource i other than a frequency domain resource of the P first resource units. Specifically, the time domain resource of the third resource may be understood as a component of the third resource in time domain; the time domain resource of the P first resource units may be understood as a resource carrying a first DMRS in time domain, or a component of the P first resource units in time domain; the frequency domain resource of the third resource may be understood as a component of the third resource in frequency domain; and the frequency domain resource of the P first resource units may be understood as a resource carrying the first DMRS in frequency domain, or a component of the P first resource units in frequency domain.

Figure 7:
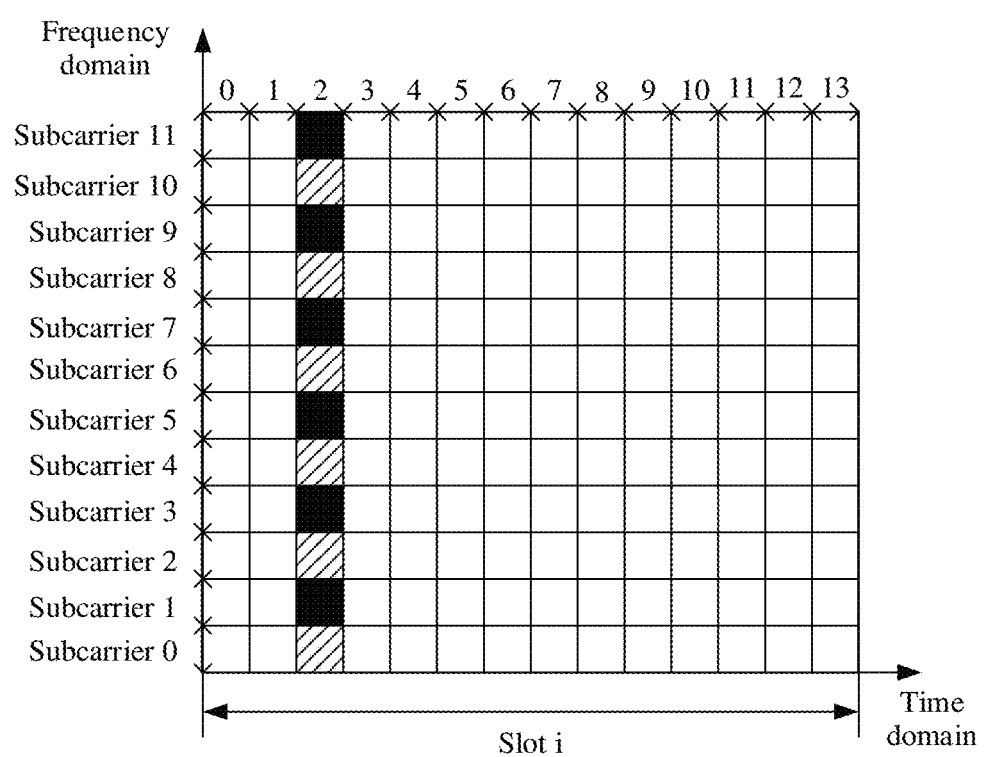
FIG. 7 is a schematic diagram of a ZP resource according to an embodiment of this application.

For example, in NR, a normal CP is used as an example. A resource i is one RB, is one slot in time domain, includes 14 symbols, and includes 12 subcarriers in frequency domain. One resource unit may be understood as one RE. A quantity of REs that are included in the resource i and that are used to carry a DMRS is related to a DMRS pattern. For example, when a CDM group number is 1, as shown in FIG. 7, the resource i may be a slot i in time domain, include 14 symbols, where the 14 symbols are respectively a symbol 0 to a symbol 13, and include 12 subcarriers in frequency domain, where the 12 subcarriers are respectively a subcarrier 0 to a subcarrier 11. The P first resource units are a symbol 2 in time domain, and include a subcarrier 1, a subcarrier 3, a subcarrier 5, a subcarrier 7, a subcarrier 9, and a subcarrier 11 in frequency domain. In other words, the P first resource units are REs marked in black in FIG. 7. The Q second resource units may include some or all of a symbol 3 to a symbol 13 in time domain, and may include some or all of a subcarrier 0 to a subcarrier 11 in frequency domain. The third resource may be a symbol 2 in time domain, and may be some or all of a subcarrier 0, a subcarrier 2, a subcarrier 4, a subcarrier 6, a subcarrier 8, and a subcarrier 10 in frequency domain. In other words, the time domain resource of the third resource is the symbol 2, and the frequency domain resource of the third resource is some or all of the subcarrier 0, the subcarrier 2, the subcarrier 4, the subcarrier 6, the subcarrier 8, and the subcarrier 10. In other words, the third resource may be some or all of REs filled with slash lines in FIG. 7. It should be noted that the third resource may be used to carry data, or may be empty. This is not limited. It can be understood that, when the third resource does not carry information (for example, information such as data and a reference signal), the third resource may also be referred to as a ZP resource.

It should be noted that the resource i is configured by a network device for the terminal device, and may be indicated to the terminal device by using signaling (for example, downlink control information (downlink control information, DCI)).

602: The terminal device performs interference matching scenario measurement based on a signal received on the P first resource units and a signal received on the third resource, to obtain a first interference matching scenario measurement result. The first interference matching scenario measurement result indicates that interference to the first DMRS does not match interference to the first data.

It should be noted that, that the interference to the first DMRS does not match the interference to the first data may be understood as follows: The interference to the first DMRS is different from the interference to the first data, or an interference and noise signal received on the P first resource units is different from an interference and noise signal received on the third resource.

For example, an RB shown in FIG. 7 is the resource i. That the interference to the first DMRS does not match the interference to the first data is that an interference and noise signal received on an RE (namely, an RE marked in black in FIG. 7) carrying the first DMRS is different from an interference and noise signal received on the RE filled with the slash line in FIG. 7. For example, if a neighboring cell schedules and uses antenna ports 0 and 1 to send a DMRS carried on the RE marked in black in FIG. 7, and schedules and uses antenna ports 2 and 3 to send a DMRS carried on the RE filled with the slash line in FIG. 7, the interference to the first DMRS is the DMRS that is carried on the RE marked in black in FIG. 7 and that is sent by the neighboring cell by using the antenna ports 0 and 1. In other words, for a terminal device receiving the first DMRS, interference received on the RE filled with the slash line in FIG. 7 is the DMRS that is carried on the RE filled with the slash line in FIG. 7 and that is sent by the neighboring cell by scheduling and using the antenna ports 2 and 3. Therefore, the interference to the first data not only includes the DMRS that is carried on the RE marked in black in FIG. 7 and that is sent by the neighboring cell by scheduling and using the antenna ports 0 and 1, but also includes the DMRS that is carried on the RE filled with the slash line in FIG. 7 and that is sent by the neighboring cell by scheduling and using the antenna ports 2 and 3. In other words, the interference to the first DMRS is different from the interference to the first data.

In some embodiments, the terminal device may perform interference matching scenario measurement based on the signal received on the P first resource units and the signal received on the third resource in the following manner:

The terminal device performs interference and noise measurement on the P first resource units based on the signal received on the P first resource units, to obtain a first interference and noise sub-measurement result. The first interference and noise sub-measurement result indicates a covariance matrix of interference and noise on the P first resource units. Specifically, the covariance matrix of the interference and noise on the P first resource units may also be referred to as an autocorrelation matrix of the interference and noise on the P first resource units, and is used to represent statistical characteristic information of interference and noise on the first DMRS, for example, power of the interference and noise on the first DMRS, or spatial correlation of the interference and noise on the first DMRS.

For example, the covariance matrix of the interference and noise on the P first resource units satisfies an expression (1):

$$RuuP = \frac{1}{P}\sum_{j=0}^{P-1} n_j n_j^H \tag{1}$$

$$n_j = y_j - h_j x_j$$

Herein, RuuP is the covariance matrix of the interference and noise on the P first resource units, $y_i$ is a signal received on a $j^{th}$ first resource unit in the P first resource units, $h_i$ is a channel estimation value of the $j^{th}$ first resource unit in the P first resource units, $x_j$ is a first DMRS carried on the $j^{th}$ first resource unit in the P first resource units, and $n_j$ is interference and noise on the $j^{th}$ first resource unit in the P first resource units.

The terminal device performs interference and noise measurement on the third resource based on the signal received on the third resource, to obtain a second interference and noise sub-measurement result. The second interference and noise sub-measurement result indicates a covariance matrix of interference and noise on the third resource. Specifically, an auto-covariance matrix of the interference and noise on the third resource may be referred to as an autocorrelation matrix of the interference and noise on the third resource, and is used to represent statistical characteristic information of the interference and noise received on the third resource, for example, power of the interference and noise received on the third resource, or spatial correlation of the interference and noise received on the third resource.

For example, when the third resource is a ZP resource, the covariance matrix of the interference and noise on the third resource may satisfy an expression (2):

$$RuuD = \frac{1}{M_1}\sum_{i=0}^{M_1-1} y_i y_i^H \tag{2}$$

Herein, RuuD is the covariance matrix of the interference and noise on the third resource, M1 is a total quantity of resource units in the third resource, and $y_i$ is a signal received on an $i^{th}$ resource unit in the third resource.

For another example, when the third resource is not a ZP resource, for example, the third resource carries data, the covariance matrix of the interference and noise on the third resource satisfies an expression (3):

$$RuuD = \frac{1}{M_1}\sum_{i=0}^{M_1-1} y_i y_i^H - \frac{1}{M_1}\sum_{i=0}^{M_1-1} h_i h_i^H \quad (3)$$

Herein, RuuD is the covariance matrix of the interference and noise on the third resource, M1 is the total quantity of resource units in the third resource, $y_i$ is a signal received on an $i^{th}$ resource unit in the third resource, and $h_i$ is a channel estimation value of the $i^{th}$ resource unit in the third resource.

Then, the terminal device performs interference matching scenario measurement based on the first interference and noise sub-measurement result and the second interference and noise sub-measurement result.

For example, the terminal device determines a first value based on the first interference and noise sub-measurement result and the second interference and noise sub-measurement result. The first value indicates a difference between the interference and noise on the P first resource units and the interference and noise on the third resource. When the first value is greater than or equal to a first threshold, the terminal device obtains the first interference matching scenario measurement result.

Further, in some other embodiments, when the first value is less than the first threshold, the terminal device obtains a second interference matching scenario measurement result. The second interference matching scenario measurement result indicates that the interference to the first DMRS matches the interference to the first data. When obtaining the second interference matching scenario measurement result, the terminal device may not report the second interference matching scenario measurement result to the network device, or may report the second interference matching scenario measurement result to the network device. This is not limited. When the terminal device reports the second interference matching scenario measurement result to the network device, the network device receives the second interference matching measurement result, and may not configure the ZP resource for the PDSCH of the terminal device.

It should be noted that the first threshold may be pre-defined by using a protocol, or may be indicated by the network device to the terminal device. This is not limited.

For example, the first value may satisfy an expression (4):

$$R = \|RuuP - RuuD\|_F^2 \quad (4)$$

Herein, R is the first value, RuuP is the covariance matrix of the interference and noise on the P first resource units, and RuuD is the covariance matrix of the interference and noise on the third resource. Specifically, for RuuP and RuuD, refer to the foregoing related descriptions. Details are not described herein again.

It should be noted that the foregoing description is merely an example description of determining RuuP, RuuD, and R, and a specific implementation of calculating or determining RuuP, RuuD, and R is not limited in this embodiment of this application.

In addition, it should be further noted that in this embodiment of this application, the first interference matching scenario measurement result and the second interference matching measurement result may be indicated by using different identifiers. For example, the first interference matching scenario measurement result may be indicated by using an identifier 1, the second interference matching measurement result may be indicated by using an identifier 2, the identifier 1 may be a first character, a first sequence, or the like, and the identifier 1 may be a second character, a second sequence, or the like. The identifier 1 indicates the first interference matching scenario measurement result, and the identifier 2 indicates the second interference matching measurement result. This may be pre-agreed in a protocol, or may be indicated by the network device to the terminal device in advance. This is not limited.

Further, in some embodiments, when the terminal device has a capability of supporting to measure the interference and noise of the PDSCH based on a combination of a DMRS and the ZP resource, after receiving a signal on a resource (for example, the resource i) used for PDSCH transmission, the terminal device performs interference matching measurement. In other words, in this case, when the terminal device has the capability of supporting to measure the interference and noise of the PDSCH based on the combination of the DMRS and the ZP resource, each time the terminal device receives the signal on the resource used for PDSCH transmission, interference matching measurement needs to be performed regardless of whether the ZP resource is configured in the resource used for PDSCH transmission. NR is used as an example. Resource scheduling is performed, at a granularity of a slot in time domain, on the resource used for PDSCH transmission. When the terminal device has the capability of supporting to measure the interference and noise of the PDSCH based on the combination of the DMRS and the ZP resource, interference matching measurement is performed in each slot in which the resource used for PDSCH transmission is invoked.

Alternatively, for another example, when the terminal device has the capability of supporting to measure the interference and noise of the PDSCH based on the combination of the DMRS and the ZP resource, the terminal device detects that the resource i is a last resource that is used for PDSCH transmission and on which a ZP resource is configured, and performs interference matching measurement. This manner may be applied to a scenario in which a ZP resource is configured for the resource used for PDSCH transmission in a time period.

In this embodiment of this application, that the terminal device has the capability of supporting to measure the interference and noise of the PDSCH based on the combination of the DMRS and the ZP resource may be understood as follows: The terminal device may perform interference and noise measurement on the PDSCH based on a signal received on a resource unit carrying the DMRS and a signal received on the ZP resource, to obtain an interference and noise measurement result. The interference measurement result indicates an auto-covariance matrix of the interference and noise of the PDSCH. The covariance matrix of the interference and noise of the PDSCH may also be referred to as an autocorrelation matrix of the interference and noise of the PDSCH, and represents statistical characteristic information of interference and noise received on the resource used for PDSCH transmission, for example, power of the interference and noise received on the resource used for PDSCH transmission, or spatial correlation of the interference and noise received on the resource used for PDSCH transmission. The interference and noise measurement result is obtained based on the signal received on the resource unit carrying the DMRS and the signal received on the ZP resource, to improve accuracy of statistical characteristic information that is of the interference and noise received on the resource used for PDSCH transmission and that is represented by the autocorrelation matrix that is of the interference and noise of the PDSCH and that is indicated by the interference measurement result. Therefore, when the terminal device can perform data demodulation based on the obtained autocorrelation matrix of the interference and noise of the PDSCH, a probability that data demodulation succeeds is improved, to further help improve receiving performance in the communication system.

It can be understood that, in this embodiment of this application, that the terminal device has the capability of supporting to measure the interference and noise of the PDSCH based on the combination of the DMRS and the ZP resource may also be described as follows: The terminal device has a capability of supporting a combination of a ZP-DMRS and IRC, the terminal device has a capability of supporting to measure interference and noise by using the ZP resource, or the like. This is not limited.

Specifically, for the covariance matrix of the interference and noise of the PDSCH in this embodiment of this application, refer to the following related descriptions. Details are not described herein again.

603: The terminal device reports the first interference matching scenario measurement result to the network device.

For example, the terminal device may report the first interference measurement result to the network device through a physical uplink shared channel (physical uplink shared channel, PUSCH) or a physical uplink control channel (physical uplink control channel, PUCCH). Further, in some embodiments, the terminal device further reports a terminal capability indication to the network device. The terminal capability indication indicates that the terminal device has the capability of supporting to measure the interference and noise of the PDSCH based on the combination of the DMRS and the ZP resource. This provides a guide for the network device to configure the ZP resource for the resource used by the terminal device for PDSCH transmission.

It should be noted that, the first interference measurement result and the terminal capability indication may be carried in one message and sent to the network device, or may be carried in different messages and sent to the network device. This is not limited.

604: The network device receives the first interference matching measurement result, and sends resource indication information to the terminal device, where the resource indication information indicates the ZP resource configured for the PDSCH of the terminal device.

It should be noted that, in this embodiment of this application, the ZP resource configured for the PDSCH of the terminal device may be a ZP resource configured, within a time period, for Y resources of the terminal device that are used for PDSCH transmission. The time period herein may be one or more resource scheduling granularities in time domain. NR is used as an example. A resource scheduling granularity in time domain is a slot, and the ZP resource configured for the PDSCH of the terminal device may be configured, in one or more slots, for the Y resources of the terminal device that are used for PDSCH transmission. For example, a value of Y is 1 when the ZP resource configured for the PDSCH of the terminal device is configured, in one slot, for the Y resources of the terminal device that are used for PDSCH transmission. For another example, a value of Y is 2 when the ZP resource configured for the PDSCH of the terminal device is configured, in two slots, for the Y resources of the terminal device that are used for PDSCH transmission.

Figure 8:
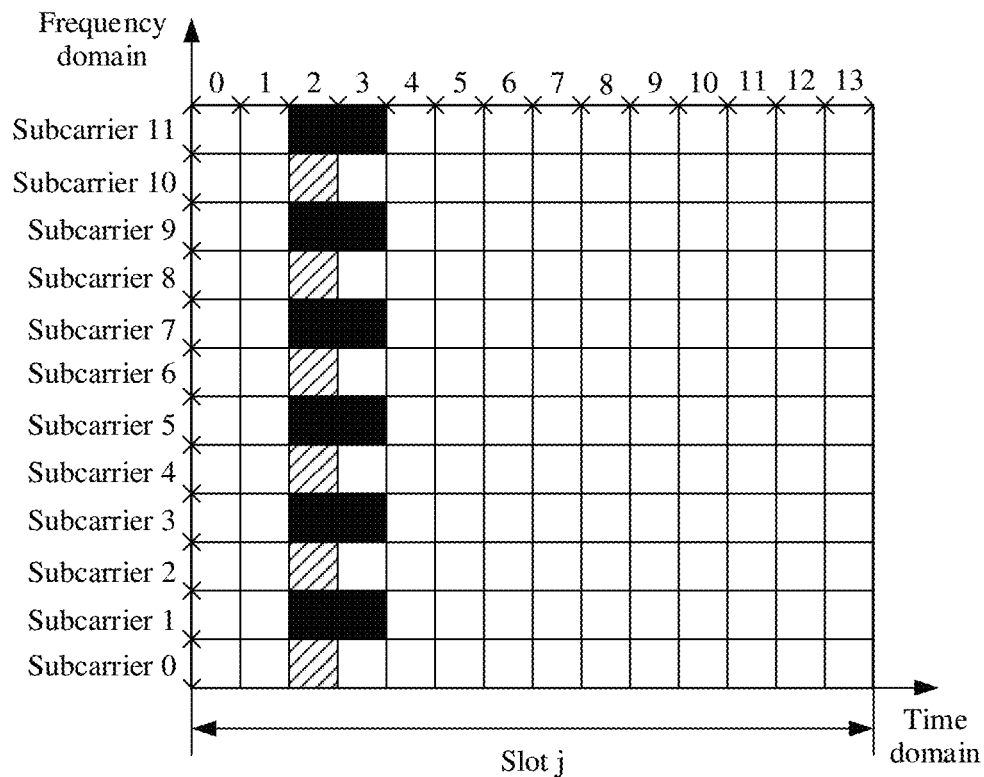
FIG. 8 is a schematic diagram of another ZP resource according to an embodiment of this application.

For example, the resource used for PDSCH transmission is a resource j. The ZP resource configured for the PDSCH of the terminal device may be some or all time domain resources used to carry a second DMRS in the resource j in time domain, and may be some or all frequency domain resources in the resource j other than the frequency domain resource carrying the second DMRS in frequency domain. It should be noted that a pattern of the second DMRS may be the same as a pattern of the first DMRS, or may be different from a pattern of the first DMRS. This is not limited. For example, the resource j is an RB shown in FIG. 8. The resource j is a slot j in time domain, and includes 12 subcarriers in frequency domain A resource used to carry the second DMRS in the resource j is a symbol 2 and a symbol 3 in the slot j in time domain, and is a subcarrier 1, a subcarrier 3, a subcarrier 5, a subcarrier 7, a subcarrier 9, and a subcarrier 11 in frequency domain. The ZP resource in the resource j may be a symbol 2 and/or a symbol 3 in the slot j in time domain, and may be one or more of a subcarrier 0, a subcarrier 2, a subcarrier 4, a subcarrier 6, a subcarrier 8, and a subcarrier 11 in frequency domain. For example, when the ZP resource in the resource j is a symbol 2 in time domain, and is a subcarrier 0, a subcarrier 2, a subcarrier 4, a subcarrier 6, a subcarrier 8, and a subcarrier 10 in frequency domain, namely, an RE filled with a slash line in the RB shown in FIG. 8, the terminal device may perform data communication on a symbol 3, the subcarrier 0, the subcarrier 2, the subcarrier 4, the subcarrier 6, the subcarrier 8, and the subcarrier 10. This symbol-based ZP resource configuration manner is applicable to a single user (single user, SU) scenario, to help reduce resource overheads, and improve resource utilization. For another example, the ZP resource in the resource j is a symbol 2 and a symbol 3 in time domain, and is a subcarrier 0, a subcarrier 2, a subcarrier 4, a subcarrier 6, a subcarrier 8, and a subcarrier 10 in frequency domain. This manner may be applied to a multi-user (multi-user, MU) scenario.

Further, when the terminal device further sends and reports the terminal capability indication to the network device, the terminal capability indication indicates that the terminal device has the capability of supporting to measure the interference and noise of the PDSCH based on the combination of the DMRS and the ZP resource. After receiving the first interference matching measurement result and the terminal capability indication, the network device sends the resource indication information to the terminal device.

Figure 9:
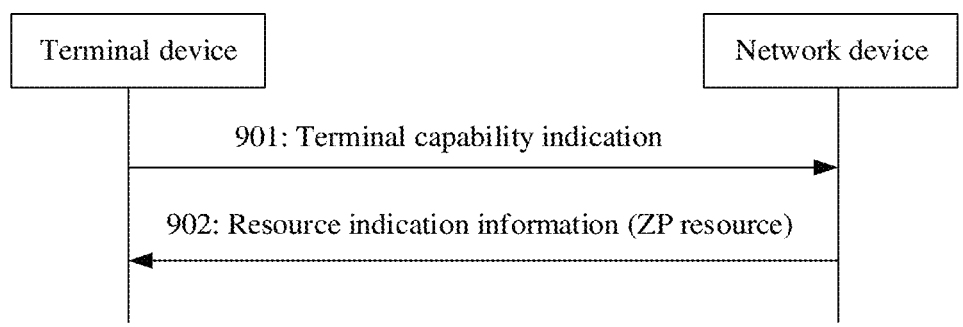
FIG. 9 is a schematic flowchart of another resource indication method according to an embodiment of this application.

For another example, FIG. 9 is a schematic flowchart of another resource indication method according to an embodiment of this application. The method specifically includes the following steps.

901: After initially accessing a network or handing over a network, a terminal device reports a terminal capability indication to a network device, where the terminal capability indication indicates that the terminal device has a capability of supporting to measure interference and noise of a PDSCH based on a combination of a DMRS and a ZP resource. Specifically, for a case in which the terminal device has the capability of supporting to measure the interference and noise of the PDSCH based on the combination of the DMRS and the ZP resource, refer to related descriptions in the method shown in FIG. 6. Details are not described herein again.

902: The network device receives the terminal capability indication from the terminal device, and sends resource indication information to the terminal device, where the resource indication information indicates the ZP resource configured for the PDSCH of the terminal device.

Different from FIG. 6, in the resource indication method shown in FIG. 9, the ZP resource configured for the PDSCH of the terminal device may be understood as a ZP resource configured for all resources used by the terminal device for PDSCH transmission. The ZP resource may be configured based on a symbol, or may not be configured based on a symbol. For details, refer to related descriptions in the method shown in FIG. 6. The details are not described herein again.

Compared with the resource indication method shown in FIG. 6, in the resource indication method shown in FIG. 9, when the terminal device has a capability of supporting to measure the interference and noise of the PDSCH based on the combination of the DMRS and the ZP resource, the network device configures the ZP resource for the PDSCH of the terminal device, to help simplify an implementation.

Figure 10:
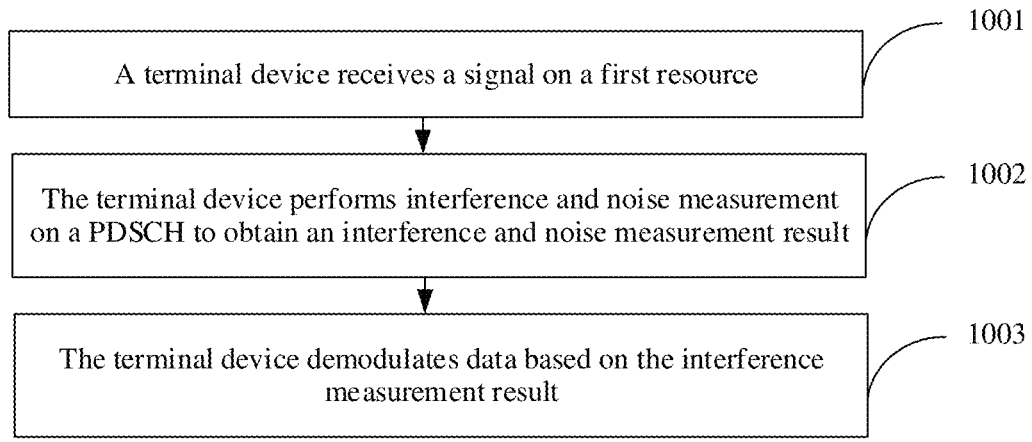
FIG. 10 is a schematic flowchart of an interference rejection combining method according to an embodiment of this application.

In addition, when a ZP resource is configured for a resource used for PDSCH transmission, an embodiment of this application further provides an interference rejection combining method. For example, the resource used for PDSCH transmission is a first resource. FIG. 10 is a schematic flowchart of an interference rejection combining method according to an embodiment of this application. The method specifically includes the following steps.

1001: A terminal device receives a signal on a first resource, where the first resource includes N first resource units, a ZP resource, and M second resource units. The first resource unit is a resource unit carrying a DMRS reference signal, the second resource unit is a resource unit carrying data, and M and N are positive integers. A value of N is related to a DMRS pattern.

The ZP resource in this embodiment of this application may be configured in the method shown in FIG. 6 or FIG. 9, or may be predefined by using a protocol. This is not limited. In addition, for the first resource, refer to related descriptions of a resource i in FIG. 6. Details are not described herein again.

1002: The terminal device performs interference and noise measurement on a PDSCH based on a signal received on the N first resource units and a signal received on the ZP resource, to obtain an interference and noise measurement result. The interference and noise measurement result indicates a covariance matrix of interference and noise of the PDSCH.

In this embodiment of this application, the covariance matrix of the interference and noise of the PDSCH may also be referred to as an autocorrelation matrix of the interference and noise of the PDSCH, and represents statistical characteristic information of interference and noise received on the resource used for PDSCH transmission, for example, power of the interference and noise received on the resource used for PDSCH transmission, or spatial correlation of the interference and noise received on the resource used for PDSCH transmission.

For example, the interference and noise measurement result may be the covariance matrix of the interference and noise of the PDSCH, or may be an identifier representing the covariance matrix of the interference and noise of the PDSCH. This is not limited in this embodiment of this application.

In some embodiments, the covariance matrix of the interference and noise of the PDSCH may satisfy an expression (5):

$$Ruu = \frac{1}{K}\sum_{t=0}^{K-1} n_t n_t^H \qquad (5)$$

$$K = N + L$$

Herein, Ruu is the covariance matrix of the interference and noise of the PDSCH, L is a total quantity of resource units in the ZP resource, and $n_t$ is an interference and noise signal on the N first resource units and a $t^{th}$ resource unit in the L resource units in the ZP resource.

That the first resource is an RB shown in FIG. 7 is used as an example. The first resource is a slot i in time domain, and includes 12 subcarriers in frequency domain, where the 12 subcarriers are respectively a subcarrier 0 to a subcarrier 11. The N first resource units are a symbol 2 in time domain, and include a subcarrier 1, a subcarrier 3, a subcarrier 5, a subcarrier 7, a subcarrier 9, and a subcarrier 11 in frequency domain, namely, six REs marked in black in FIG. 7. The ZP resource is a symbol 2 in time domain, and includes a subcarrier 0, a subcarrier 2, a subcarrier 4, a subcarrier 6, a subcarrier 8, and a subcarrier 10 in frequency domain, namely, six REs filled with a slash line in FIG. 7. In this case, in the expression (5), a value of N is 6, and a value of L is 6. For example, a value of t is obtained based on a number of a subcarrier. That the value of t is 1 is used as an example, and $n_t$ is an interference and noise signal received on an RE including a subcarrier 1 and a symbol 2 in the six REs marked in black and the six REs filled with the slash line in FIG. 7.

For example, the $t^{th}$ resource unit is the first resource unit. In other words, the interference and noise signal $n_t$ on the $t^{th}$ resource unit satisfies the following expression (6):

$$n_t = y_t - h_t x_t \qquad (6)$$

Herein, $y_t$ is a signal received on the $t^{th}$ resource unit, $h_t$ is a channel estimation value of a $j^{th}$ resource unit, and $x_t$ is a DMRS (known).

For example, the $t^{th}$ resource unit is one resource unit in the ZP resource. In other words, the interference and noise signal $n_t$ on the $t^{th}$ resource unit satisfies the following expression (7):

$$n_t = y_t$$

Herein, $y_t$ is a signal received on the $t^{th}$ resource unit.

1003: The terminal device demodulates, based on the interference and noise measurement result, data received on the M second resource units, to obtain data carried on M second resources.

In other words, the terminal device demodulates, based on the covariance matrix of the interference and noise of the PDSCH, the data received on the M second resource units, to obtain data carried on M second resources.

In this embodiment of this application, the interference and noise measurement result is obtained based on the signal received on the resource unit carrying the DMRS and the signal received on the ZP resource, to improve accuracy of statistical characteristic information that is of the interference and noise received on the resource used for PDSCH transmission and that is represented by the autocorrelation matrix that is of the interference and noise of the PDSCH and that is indicated by the interference measurement result. Therefore, when the terminal device can perform data demodulation based on the obtained autocorrelation matrix of the interference and noise of the PDSCH, a probability that data demodulation succeeds is improved, to further help improve receiving performance in the communication system.

The foregoing embodiments may be used in combination with each other, or may be used independently. This is not limited herein.

In the foregoing embodiments provided in this application, a communication method provided in embodiments of this application is described from a perspective of using the terminal device as an execution body. To implement functions in the communication method provided in the foregoing embodiments of this application, the terminal device may include a hardware structure and/or a software module, to implement the foregoing functions in a form of the hardware structure, the software module, or a combination of the hardware structure and the software module. Whether one of the foregoing functions is performed in the manner of a hardware structure, a software module, or a hardware structure and a software module depends on a specific application and design constraints of the technical solutions.

Figure 11:
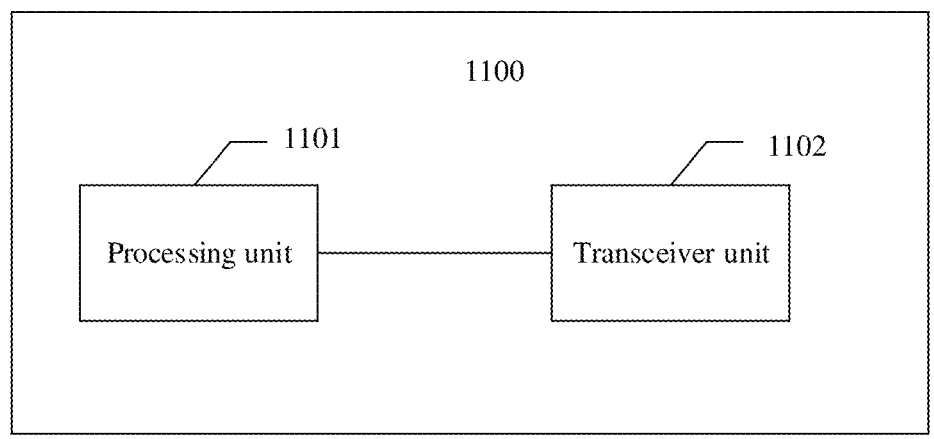
FIG. 11 is a schematic diagram of a structure of a communication apparatus according to an embodiment of this application.

Same as the foregoing conception, as shown in FIG. 11, an embodiment of this application further provides a communication apparatus 1100, configured to implement a function of a terminal device in the foregoing methods. The communication apparatus 1100 may be a terminal device, or may be an apparatus in the terminal device. The communication apparatus may alternatively be a chip system. In this embodiment of this application, the chip system may include a chip, or may include the chip and another discrete component.

In an example, the communication apparatus 1100 includes a processing unit 1101 and a transceiver unit 1102. The transceiver unit 1102 is configured to receive a signal on a first resource. The first resource includes N first resource units, a ZP resource, and M second resource units, the first resource unit is a resource unit carrying a first DMRS, the second resource unit is a resource unit carrying first data, and N and M are positive integers. The processing unit 1101 is configured to: perform interference and noise measurement on a PDSCH based on a signal received on the N first resource units and a signal received on the ZP resource, to obtain an interference and noise measurement result, and demodulate, based on the interference and noise measurement result, a signal received on the M second resource units, to obtain the first data. The interference and noise measurement result indicates a covariance matrix of interference and noise of the PDSCH.

In a possible implementation, the transceiver unit 1102 is further configured to report a terminal capability indication to a network device. The terminal capability indication indicates that the communication apparatus 1100 has a capability of supporting to measure the interference and noise of the PDSCH based on a combination of a DMRS and the ZP resource.

In a possible implementation, the transceiver unit 1102 is further configured to receive a signal on a second resource. The second resource includes P third resource units, a third resource, and Q fourth resource units, the third resource unit is a resource unit carrying a second DMRS, the third resource is at least one resource unit in the second resource other than the P third resource units and the Q fourth resource units, the fourth resource unit is a resource unit carrying second data, and P and Q are positive integers. The processing unit 1101 is further configured to trigger the transceiver unit 1102 to report a first interference matching scenario measurement result to the network device based on a signal received on the P third resource units and a signal received on the third resource. The first interference matching scenario measurement result indicates that interference to the second DMRS does not match interference to the second data.

In a possible implementation, the transceiver unit 1102 is further configured to receive resource indication information sent by the network device. The resource indication information indicates the ZP resource configured for the PDSCH of the communication apparatus 1100.

Figure 12:
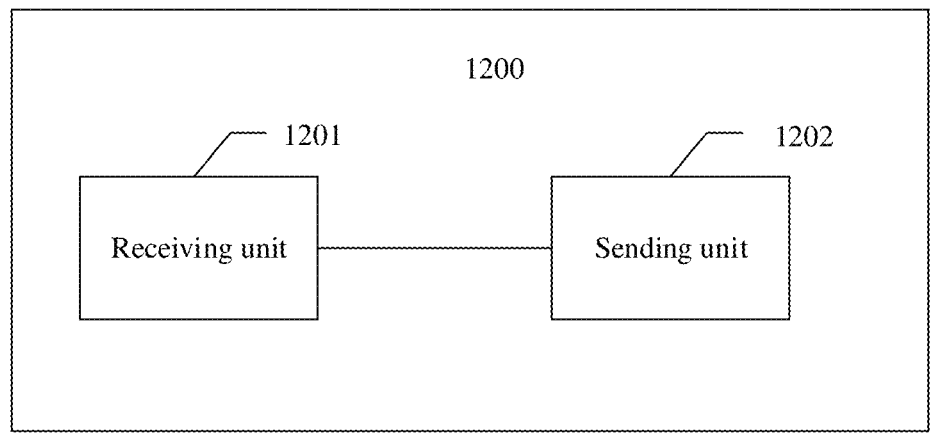
FIG. 12 is a schematic diagram of a structure of another communication apparatus according to an embodiment of this application.

As shown in FIG. 12, an embodiment of this application further provides a communication apparatus 1200, configured to implement a function of a network device in the foregoing method. The communication apparatus 1200 may be a network device, or may be an apparatus in the network device. The communication apparatus may alternatively be a chip system. In this embodiment of this application, the chip system may include a chip, or may include the chip and another discrete component.

In an example, the communication apparatus 1200 includes a receiving unit 1201 and a sending unit 1202. The receiving unit 1201 is configured to receive a terminal capability indication and/or a first interference matching scenario measurement result from a terminal device. The terminal capability indication indicates that the terminal device has a capability of supporting to measure interference and noise of a PDSCH based on a combination of a demodulation reference signal DMRS and a zero power ZP resource, and the first interference matching scenario measurement result indicates that interference to the DMRS of the terminal device does not match interference to data. The sending unit 1202 is configured to send resource indication information to the terminal device. The resource indication information indicates the ZP resource configured for the PDSCH of the terminal device.

For specific execution processes of the processing unit 1101, the transceiver unit 1102, the receiving unit 1201, and the sending unit 1202, refer to descriptions in the foregoing method embodiments. Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Figure 13:
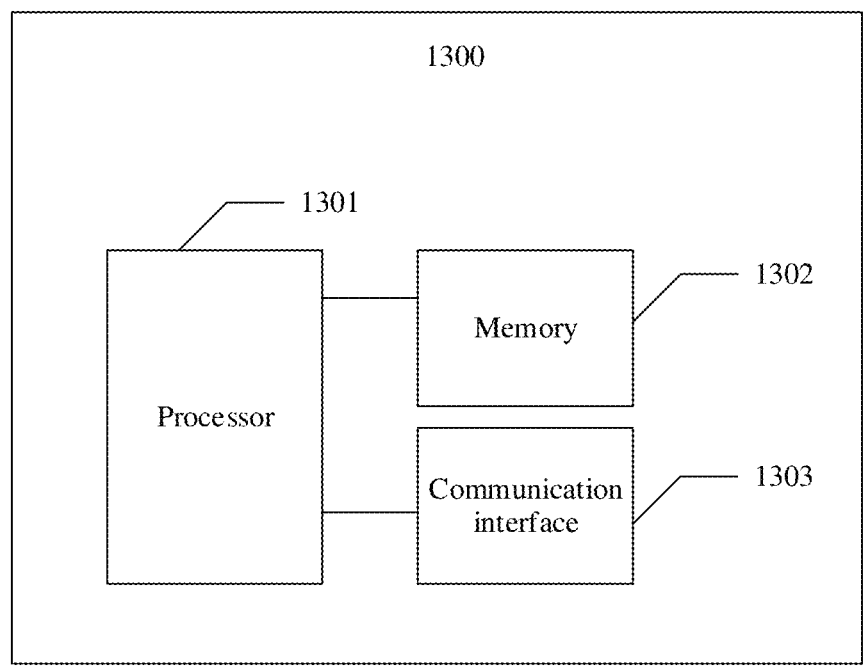
FIG. 13 is a schematic diagram of a structure of still another communication apparatus according to an embodiment of this application.

Same as the foregoing conception, as shown in FIG. 13, an embodiment of this application further provides a communication apparatus 1300.

In an example, the communication apparatus 1300 is configured to implement a function of a terminal device in the foregoing methods. The communication apparatus 1300 may be a terminal device, or may be an apparatus in the terminal device. The communication apparatus 1300 includes at least one processor 1301, configured to implement the function of the terminal device in the foregoing methods. For example, the processor 1301 may be configured to perform interference and noise measurement based on a signal received on a resource unit carrying a DMRS and a signal received on a ZP resource. For details, refer to detailed descriptions in the methods. The details are not described herein again.

In some embodiments, the communication apparatus 1300 may further include at least one memory 1302, configured to store program instructions and/or data. The memory 1302 is coupled to the processor 1301. The coupling in this embodiment of this application is indirect coupling or a communication connection between apparatuses, units, or modules for information exchange between the apparatuses, the units, or the modules, and may be in electrical, mechanical, or other forms. In another implementation, the memory 1302 may alternatively be located outside the communication apparatus 1300. The processor 1301 may cooperate with the memory 1302. The processor 1301 may execute the program instructions stored in the memory 1302. At least one of the at least one memory may be included in the processor.

In some embodiments, the communication apparatus 1300 may further include a communication interface 1303, configured to communicate with another device by using a transmission medium, so that an apparatus in the communication apparatus 1300 may communicate with another device. For example, the communication interface 1303 may be a transceiver, a circuit, a bus, a module, or another type of communication interface, and the another device may be a network device, another terminal device, or the like. The processor 1301 sends and receives a signal through the communication interface 1303, and is configured to implement the method in the foregoing embodiments. For example, the communication interface 1303 may be configured to receive resource indication information from the network device.

In an example, the communication apparatus 1300 is configured to implement a function of a network device in the foregoing methods. The communication apparatus 1300 may be a network device, or may be an apparatus in the network device. The communication apparatus 1300 includes at least one processor 1301, configured to implement a function of the network device in the foregoing methods. For example, the processor 1301 may be configured to generate resource indication information, or the like when a terminal capability indication reported by the terminal device indicates that the terminal device has a capability of supporting to measure interference and noise of a PDSCH based on a combination of a DMRS and a ZP resource. For details, refer to detailed descriptions in the methods. This is not described herein again.

In some embodiments, the communication apparatus 1300 may further include at least one memory 1302, configured to store program instructions and/or data. The memory 1302 is coupled to the processor 1301. The coupling in this embodiment of this application is indirect coupling or a communication connection between apparatuses, units, or modules for information exchange between the apparatuses, the units, or the modules, and may be in electrical, mechanical, or other forms. In another implementation, the memory 1302 may alternatively be located outside the communication apparatus 1300. The processor 1301 may cooperate with the memory 1302. The processor 1301 may execute the program instructions stored in the memory 1302. At least one of the at least one memory may be included in the processor.

In some embodiments, the communication apparatus 1300 may further include a communication interface 1303, configured to communicate with another device by using a transmission medium, so that an apparatus in the communication apparatus 1300 may communicate with another device. For example, the communication interface 1303 may be a transceiver, a circuit, a bus, a module, or another type of communication interface, and the another device may be a network device, another terminal device, or the like. The processor 1301 sends and receives a signal through the communication interface 1303, and is configured to implement the method in the foregoing embodiments. For example, the communication interface 1303 may send resource indication information.

A connection medium between the communication interface 1303, the processor 1301, and the memory 1302 is not limited in this embodiment of this application. For example, in this embodiment of this application, in FIG. 13, the memory 1302, the processor 1301, and the communication interface 1303 may be connected by using a bus. The bus may include an address bus, a data bus, a control bus, or the like.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

In this embodiment of this application, the memory may be a nonvolatile memory, for example, a hard disk drive (hard disk drive, HDD), a solid state drive (solid-state drive, SSD), or the like, or may be a volatile memory (volatile memory), for example, a random access memory (random-access memory, RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

All or some of the methods in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An interference rejection combining method, wherein the method comprises:

receiving, by a terminal device, one or more signals on a first resource, wherein the first resource includes N first resource units, a zero power (ZP) resource, and M second resource units, the N first resource units includes a first resource unit carrying a first demodulation reference signal DMRS, the M second resource units includes a second resource unit carrying first data, and N and M are positive integers;

performing, by the terminal device, interference and noise measurement on a physical downlink shared channel (PDSCH) based on a first signal of the one or more signals received on the N first resource units and a second signal of the one or more signals received on the ZP resource, to obtain an interference and noise measurement result, wherein the interference and noise measurement result indicates a first covariance matrix of interference and noise of the PDSCH; and demodulating, by the terminal device based on the interference and noise measurement result, a third signal of the one or more signals received on the M second resource units, to obtain the first data.

2. The method according to claim 1, wherein the method further comprises:

reporting, by the terminal device, a terminal capability indication to a network device, wherein the terminal capability indication indicates that the terminal device has a capability of supporting the performing the interference and noise measurement on PDSCH based on a combination of a DMRS and the ZP resource.

3. The method according to claim 1, wherein the method further comprises:

receiving, by the terminal device, one or more signals on a second resource, wherein the second resource includes P third resource units, a third resource, and Q fourth resource units, the P third resource units includes a third resource unit carrying a second DMRS, the third resource is at least one resource unit in the second resource other than the P third resource units and the Q fourth resource units, the Q fourth resource units includes a fourth resource unit carrying second data, and P and Q are positive integers; and reporting, by the terminal device, a first interference matching scenario measurement result to the network device based on a first signal of the one or more signals received on the P third resource units and a second signal of the one or more signals received on the third resource, wherein the first interference matching scenario measurement result indicates that interference to the second DMRS does not match interference to the second data.

4. The method according to claim 2, wherein the method further comprises:

receiving, by the terminal device, resource indication information from the network device, wherein the resource indication information indicates the ZP resource configured for the PDSCH of the terminal device.

5. The method according to claim 3, wherein the reporting, by the terminal device, a first interference matching scenario measurement result to the network device based on a signal received on the P third resource units and a signal received on the third resource includes:

performing, by the terminal device, interference and noise measurement on the P third resource units based on the first signal received on the P third resource units, to obtain a first interference and noise sub-measurement result, wherein the first interference and noise sub-measurement result indicates a second covariance matrix of interference and noise on the P third resource units;

performing, by the terminal device, interference and noise measurement on the third resource based on the second signal received on the third resource, to obtain a second interference and noise sub-measurement result, wherein the second interference and noise sub-measurement result indicates a third covariance matrix of interference and noise on the third resource; and sending, by the terminal device, the first interference matching scenario measurement result to the network device based on the first interference sub-measurement result and the second interference sub-measurement result.

6. A resource indication method, wherein the method comprises:

receiving, by a network device, a terminal capability indication and/or a first interference matching scenario measurement result from a terminal device, wherein the terminal capability indication indicates that the terminal device has a capability of supporting interference and noise measurement of a physical downlink shared channel (PDSCH) based on a combination of a demodulation reference signal DMRS and a zero power ZP resource, and the first interference matching scenario measurement result indicates that interference to the DMRS of the terminal device does not match interference to data; and sending, by the network device, resource indication information to the terminal device, wherein the resource indication information indicates the ZP resource configured for the PDSCH of the terminal device.

7. The method according to claim 6, wherein a time domain resource of the ZP resource is some or all time domain resources in the PDSCH resource that are used to carry the DMRS.

8. A communication apparatus, comprising:

a memory storing computer-readable instructions;

a transceiver configured to receive one or more signals on a first resource, wherein the first resource includes N first resource units, a zero power ZP resource, and M second resource units, the N first resource units include a first resource unit carrying a first demodulation reference signal DMRS, the M second resource units include a second resource unit carrying first data, and N and M are positive integers; and a processor connected to the memory and transceiver, wherein the processor is configured to execute the computer-readable instructions to:

perform interference and noise measurement on a physical downlink shared channel PDSCH based on a first signal of the one or more signals received on the N first resource units and a second signal of the one or more signals received on the ZP resource, to obtain an interference and noise measurement result; and demodulate, based on the interference and noise measurement result, a third signal of the one or more signals received on the M second resource units, to obtain the first data, wherein the interference and noise measurement result indicates a first covariance matrix of interference and noise of the PDSCH.

9. The communication apparatus according to claim 8, wherein the processor is further configured to report a terminal capability indication to a network device via the transceiver, and the terminal capability indication indicates a capability of supporting the interference and noise measurement on the PDSCH based on a combination of a DMRS and the ZP resource.

10. The communication apparatus according to claim 8, wherein the transceiver is further configured to receive one or more signals on a second resource, wherein the second resource includes P third resource units, a third resource, and Q fourth resource units, the P third resource units include a third resource unit carrying a second DMRS, the third resource is at least one resource unit in the second resource other than the P third resource units and the Q fourth resource units, the Q fourth resource units include a fourth resource unit carrying second data, and P and Q are positive integers; and the processor is further configured to trigger, based on a first signal of the one or more signals received on the P third resource units and a second signal of the one or more signals received on the third resource, reporting a first interference matching scenario measurement result to the network device via the transceiver, wherein the first interference matching scenario measurement result indicates that interference to the second DMRS does not match interference to the second data.

11. The communication apparatus according to claim 8, wherein the processor is further configured to receive via the transceiver resource indication information from the network device, wherein the resource indication information indicates the ZP resource configured for the PDSCH of the communication apparatus.

12. The communication apparatus according to claim 10, wherein that the processor is configured to trigger, based on the signal received on the P third resource units and the signal received on the third resource, the transceiver to send the first interference matching scenario measurement result to the network device specifically by:

performing interference and noise measurement on the P third resource units based on the first signal received on the P third resource units, to obtain a first interference and noise sub-measurement result;

performing interference and noise measurement on the third resource based on the second signal received on the third resource, to obtain a second interference and noise sub-measurement result; and trigger the transceiver to send the first interference matching scenario measurement result to the network device based on the first interference sub-measurement result and the second interference sub-measurement result, wherein the first interference and noise sub-measurement result indicates a second covariance matrix of interference and noise on the P third resource units, and the second interference and noise sub-measurement result indicates a third covariance matrix of interference and noise on the third resource.

13. A communication apparatus, comprising:

a memory storing computer-readable instructions;

a receiver configured to receive a terminal capability indication and/or a first interference matching scenario measurement result from a terminal device, wherein the terminal capability indication indicates that the terminal device has a capability of supporting interference and noise measurement of a physical downlink shared channel (PDSCH) based on a combination of a demodulation reference signal DMRS and a zero power ZP resource, and the first interference matching scenario measurement result indicates that interference to the DMRS of the terminal device does not match interference to data; and a processor connected to the memory and transceiver, wherein the processor is configured to execute the computer-readable instructions to:

send, via the receiver, resource indication information to the terminal device, wherein the resource indication information indicates the ZP resource configured for the PDSCH of the terminal device.

14. The communication apparatus according to claim 13, wherein a time domain resource of the ZP resource is some or all time domain resources in the PDSCH resource that are used to carry the DMRS.

15. The communication apparatus according to of claim 8, wherein the processor is configured to implement a terminal device.

16. A non-transitory computer-readable storage medium having computer-readable instructions stored thereon, which when executed by a processor causes the processor to perform operations comprising:

receiving, by a terminal device, one or more signals on a first resource, wherein the first resource includes N first resource units, a zero power (ZP) resource, and M second resource units, the N first resource units includes a first resource unit carrying a first demodulation reference signal DMRS, the M second resource units includes a second resource unit carrying first data, and N and M are positive integers;

performing, by the terminal device, interference and noise measurement on a physical downlink shared channel (PDSCH) based on a first signal of the one or more signals received on the N first resource units and a second signal of the one or more signals received on the ZP resource, to obtain an interference and noise measurement result, wherein the interference and noise measurement result indicates a first covariance matrix of interference and noise of the PDSCH; and demodulating, by the terminal device based on the interference and noise measurement result, a third signal of the one or more signals received on the M second resource units, to obtain the first data.

17. The non-transitory computer-readable storage medium according to claim 16 further comprising:

reporting, by the terminal device, a terminal capability indication to a network device, wherein the terminal capability indication indicates that the terminal device has a capability of supporting the performing the interference and noise measurement on the PDSCH based on a combination of a DMRS and the ZP resource.

18. The non-transitory computer-readable storage medium according to claim 15 further comprising:

receiving, by the terminal device, resource indication information from the network device, wherein the resource indication information indicates the ZP resource configured for the PDSCH of the terminal device.

19. The non-transitory computer-readable storage medium according to claim 16 further comprising:
receiving, by the terminal device, one or more signals on a second resource, wherein the second resource includes P third resource units, a third resource, and Q fourth resource units, the P third resource units includes a third resource unit carrying a second DMRS, the third resource is at least one resource unit in the second resource other than the P third resource units and the Q fourth resource units, the Q fourth resource units includes a fourth resource unit carrying second data, and P and Q are positive integers; and
reporting, by the terminal device, a first interference matching scenario measurement result to the network device based on a first signal of the one or more signals received on the P third resource units and a second signal of the one or more signals received on the third resource, wherein the first interference matching scenario measurement result indicates that interference to the second DMRS does not match interference to the second data.

20. The method according to claim 19, wherein the reporting, by the terminal device, a first interference matching scenario measurement result to the network device based on a signal received on the P third resource units and a signal received on the third resource includes:
performing, by the terminal device, interference and noise measurement on the P third resource units based on the first signal received on the P third resource units, to obtain a first interference and noise sub-measurement result, wherein the first interference and noise sub-measurement result indicates a second covariance matrix of interference and noise on the P third resource units;
performing, by the terminal device, interference and noise measurement on the third resource based on the second signal received on the third resource, to obtain a second interference and noise sub-measurement result, wherein the second interference and noise sub-measurement result indicates a third covariance matrix of interference and noise on the third resource; and
sending, by the terminal device, the first interference matching scenario measurement result to the network device based on the first interference sub-measurement result and the second interference sub-measurement result.

* * * * *